United States Patent
Layton et al.

(10) Patent No.: US 9,582,340 B2
(45) Date of Patent: Feb. 28, 2017

(54) FILE LOCK

(71) Applicant: Red Hat, Inc., Raleigh, NC (US)

(72) Inventors: Jeffrey Layton, Raleigh, NC (US); James Bruce Fields, Ann Arbor, MI (US)

(73) Assignee: Red Hat, Inc., Raleigh, NC (US)

( * ) Notice: Subject to any disclaimer, the term of this patent is extended or adjusted under 35 U.S.C. 154(b) by 236 days.

(21) Appl. No.: 14/150,991

(22) Filed: Jan. 9, 2014

(65) Prior Publication Data

US 2015/0193268 A1    Jul. 9, 2015

(51) Int. Cl.
 G06F 9/46    (2006.01)
 G06F 9/52    (2006.01)

(52) U.S. Cl.
 CPC .................... G06F 9/526 (2013.01)

(58) Field of Classification Search
 None
 See application file for complete search history.

(56) References Cited

U.S. PATENT DOCUMENTS

| | | | |
|---|---|---|---|
| 6,247,025 B1 * | 6/2001 | Bacon | G06F 17/30362 |
| 7,992,150 B2 | 8/2011 | Brenner | |
| 8,321,389 B2 | 11/2012 | Marcotte | |
| 8,392,388 B2 | 3/2013 | Pasupuleti et al. | |
| 8,392,925 B2 | 3/2013 | Ramesh et al. | |
| 2008/0168454 A1 | 7/2008 | Choi et al. | |
| 2009/0094419 A1 * | 4/2009 | Sarkar | G06F 9/52 711/152 |
| 2010/0031269 A1 * | 2/2010 | Fontenot | G06F 9/524 718/107 |

OTHER PUBLICATIONS

Albahari, Joseph, "Threading in C#", 2006-2010 Last updated Apr. 27, 2011, O'Reilly Media, Inc., pp. 1-125.
"Useful Kernel Functions", Computer Science Department, UCLA, Feb. 25, 2011.
Kernel Programming Guide, Synchronization Primitives Chapter, Apple, Inc., Aug. 8, 2013, pp. 130-143.

* cited by examiner

Primary Examiner — Dong Kim
(74) Attorney, Agent, or Firm — Lowenstein Sandler LLP

(57) ABSTRACT

A system and a method are disclosed for managing file locks, including initiating, by a processing device executing a kernel, executions of a number of active tasks that each has acquired a respective lock to a record, and in response to release of a first lock to the record by an active task, waking up a previously-designated worker task out of a number of idle tasks, in which the worker task is to attempt an acquisition of a second lock on behalf of at least one remaining task of the idle tasks.

20 Claims, 9 Drawing Sheets

FILE LOCK

TECHNICAL FIELD

The present disclosure relates to a computer system, and more specifically to a method and system for managing locks that control access to a file in a multi-task operating environment.

BACKGROUND

Computing devices such as computers, tablet computers, and smart phones may include one or more processors that each may further include one more computing cores. To reduce processing time and fully utilize the computing power of the processors, an operating system for the computing device may concurrently execute multiple applications and multiple threads of instructions within each applications. These applications and threads may be collectively referred to as tasks for the one or more processors herein.

When tasks run concurrently, they may attempt to concurrently access data stored in a file or a section of a file, collectively referred to as a record herein for convenience. A record may be stored in a storage including registers, cache, memory devices, hard drives, and networked storage devices. Concurrent accesses of a same record by different tasks may create unwanted race situations. For example, after task A reads from an address pointing to a record, task B may read the same record and update the record by writing to the address pointing to the record. If, subsequent to the write by task B, task A comes back and writes to the same record, task A may run the risk of unintentionally overwriting the results of task B—which is often undesirable and unsafe.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
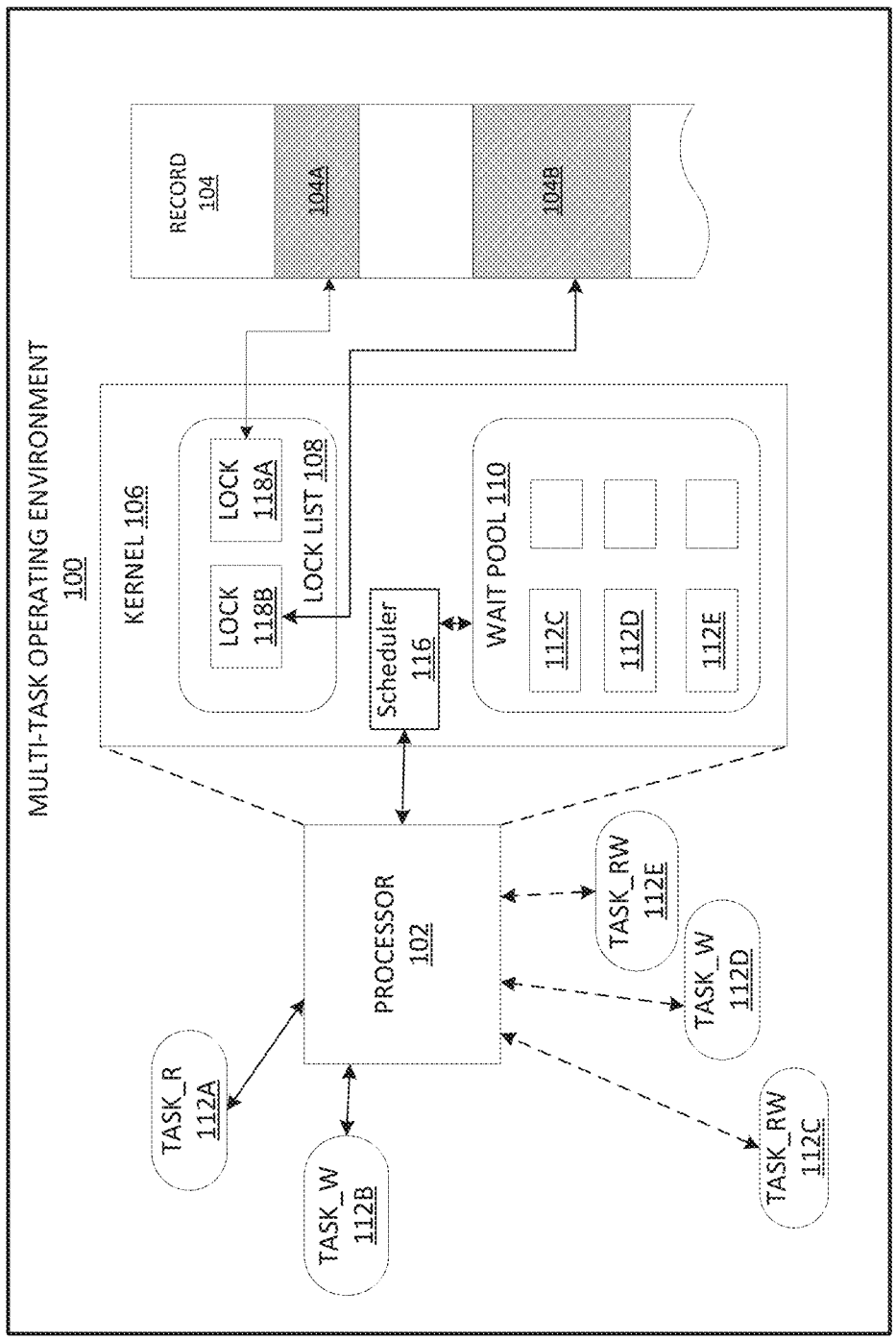
FIG. 1 illustrates a multi-task operating environment including mechanism to manage file locks.

When tasks (e.g., applications, threads, etc.) run concurrently on a computing device, they may attempt to concurrently access a record stored on the computing device. Concurrent accesses of the same record by different tasks may create unwanted race situations. One way to prevent these race situations is to use locks to assign a task certain exclusive rights to a record so that other tasks are prevented from freely accessing the record. A kernel of an operating system that is responsible for scheduling task executions may configure each task with functionalities to acquire a lock to the record. Therefore, prior to accessing a record, a task may first check a lock assigned to the record to determine if the task is allowed to access the record. If the record is available for the task, the task may first acquire the lock to the record to let other subsequent tasks know that the record is locked by the task, and then the kernel may start executing the task safely. However, if the record is not available for the task after the initial inquiry, the kernel may place the task in a pool of waiting tasks in an idle (or hold) state until the lock to the record is released.

When a task has finished the execution of instructions requiring the access to a record, the task may release the acquired lock to the record to make the record available for the tasks in waiting. In response to the release of the lock, all tasks in the pool waiting for the record may be woken up and may attempt to acquire the lock as the kernel does not discriminate among different tasks. The simultaneous attempts by all woken tasks to acquire the lock create a "thundering herd" effect because only one or a small number of tasks may succeed in acquiring a lock and the wake-up of all tasks is unnecessary. This "thundering herd" effect causes unnecessary power consumption and waste of processor computational power.

Rather than allowing all of the tasks waiting for a file lock to wake up and attempt to acquire a lock to the same record, in one implementation of the disclosure, a kernel may wake up one or only a subset of all waiting tasks, and use the woken tasks as worker tasks ("workers"). The workers may then apply for the file lock on behalf of the workers, and all or some of the tasks that are still idle in the waiting pool. In this way, fewer than all of the waiting tasks are woken up.

Implementations of the disclosure may operate on a computing device under a multi-task operating environment which may include an operating system capable of scheduling multiple processes and threads to be executed in parallel. The computing device may include a number of resources (such as a processor and a file system) whose interactions may be scheduled and executed at the direction of the operating system. Most often, the operating system may include primitives to protect records from race situations as described above.

Implementations of the present disclosure may include a method including initiating, by a processing device executing a kernel, executions of a number of active tasks that each has acquired a respective lock to a record, and in response to release of a first lock to the record by an active task, waking up a previously-designated worker task out of a number of idle tasks, in which the worker task is to attempt an acquisition of a second lock on behalf of at least one remaining task of the idle tasks.

Implementations of the present disclosure may include an apparatus including a memory and a processing device communicably coupled to the memory. The processing device may execute a kernel to initiate executions of a plurality of active tasks that each has acquired a respective lock to a record, and in response to release of a first lock to the record by an active task, wake up a previously-designated worker task out of a plurality of idle tasks, in which the worker task is to attempt an acquisition of a second lock on behalf of at least one remaining task of the idle tasks.

FIG. 1 illustrates a multi-task operating environment 100 including a kernel 106 to manage file locks. The multi-task environment 100 may manage a number of computing resources including a hardware processor 102, a file system including a record 104, and peripheral devices (not shown) such as monitors, printers, and network interfaces. Processor 102 may include one or more computing cores. In one implementation, the processor 102 may be a central processing unit (CPU) or a graphic processing unit (GPU), which may execute multiple streams of instructions or tasks.

Processor 102 may concurrently execute multiple tasks such as 112A-112E as shown in FIG. 1. These tasks may be generated by processor 102 executing different applications and/or different threads of a particular application. During execution of these tasks, each of the tasks 112A-112E may attempt to access record 104 stored in the file system.

The file system may include memories such as registers, memory devices, local and remote hard drives, and storage in a cloud. Record 104 stored on the file system may be partitioned into blocks of byte ranges (or blocks of data bytes) that are accessible according to data addresses. Methods to access record 104 may include "read" and "write" operations of the whole or part of record 104. The read operation may read, but do not change, content of record 104. The write operation, on the other hand, may modify the content of the record 104. For the example as shown in FIG. 1, task 112A may include instructions that, when executed, may attempt to read from a block 104A of data bytes in record 104, and task 112B may include instructions that, when executed, may attempt to write to byte range 104B of record 104. Likewise, tasks 112C, 112E may include instructions that may attempt to both read from and write to record 104, and task 112D may include instructions that may attempt to write to record 104.

Since the concurrent accesses to the record 104 may create race situations to the concurrent executions of tasks 112A-112E, multi-task operating environment 100 may include an operating system to manage the concurrent executions of tasks 112A-112E. The operating system may specifically include a kernel 106 that may control the access to record 104. In one implementation, kernel 106 may include a scheduler 116 that may control the order of task executions and a lock mechanism that may lock record 104 for a particular task. In one implementation, the lock mechanism may include a lock list 108 and a wait pool 110.

Lock list 108 may be a data object stored thereon a number of locks that may be used to lock down record 104 for one or more tasks. In one implementation, lock list 108 may be a semaphore data object including a number of units each of which may be used to stock one lock. In one implementation, each lock in the lock list may lock the whole record 104 or a byte range contained in record 104 for tasks that are currently executed by processor 102. For example, if a task scheduled to execute needs exclusive access to the whole record 104, the task may acquire a lock to the whole record 104 so that other tasks may not access record 104 while the currently scheduled task is being executed. However, if a set of tasks scheduled to execute do not conflict with each other in accessing record 104, the set of tasks may each acquire a lock in the lock list that locks a respective byte range of record 104. Referring to FIG. 1, since currently-scheduled tasks 112A, 112B may need to access byte ranges 104A, 104B that do not conflict with each other, tasks 112A, 112B may acquire locks 118A, 118B, respectively, in lock list 108. Lock 108A may lock byte range 104A, and lock 108B may lock byte range 104B.

Wait pool 110 may be a data object including the identifications of tasks waiting to be executed. In one implementation, wait pool 110 may be a list data object including identifications of tasks waiting for execution. Tasks in the wait pool may include tasks that failed to acquire a lock because their accesses to record 104 conflict the currently-executing tasks. Referring to FIG. 1, the attempts to access record 104 by tasks 112C-112E may conflict with the execution of tasks 112A, 112B. Therefore, tasks 112C-112E may not acquire a lock until at least one lock acquired by task 112A or 112B is released. For these reasons, scheduler 116 may place tasks 112C-112E at an idle state (inactive) and wait until there is an opportunity to acquire a lock for them.

When any one of locks in lock list 108 is released due to the completion or abort of an executing task or simply no need to lock the record 104, scheduler 116 may wake up all tasks in wait pool 110 so that they can attempt to acquire locks for themselves. As discussed above, only one or a small subset of the tasks in wait pool 110 may be able to acquire a lock for themselves. The majority of tasks woken up from wait pool 110 may not be able to acquire a lock and have to be returned to wait pool 110 back to the idle state. This unnecessary awaking of the majority of tasks in wait pool 110 may drain the computation power of processor 102 and create an abrupt uptick in electrical power consumption.

Figure 2A:
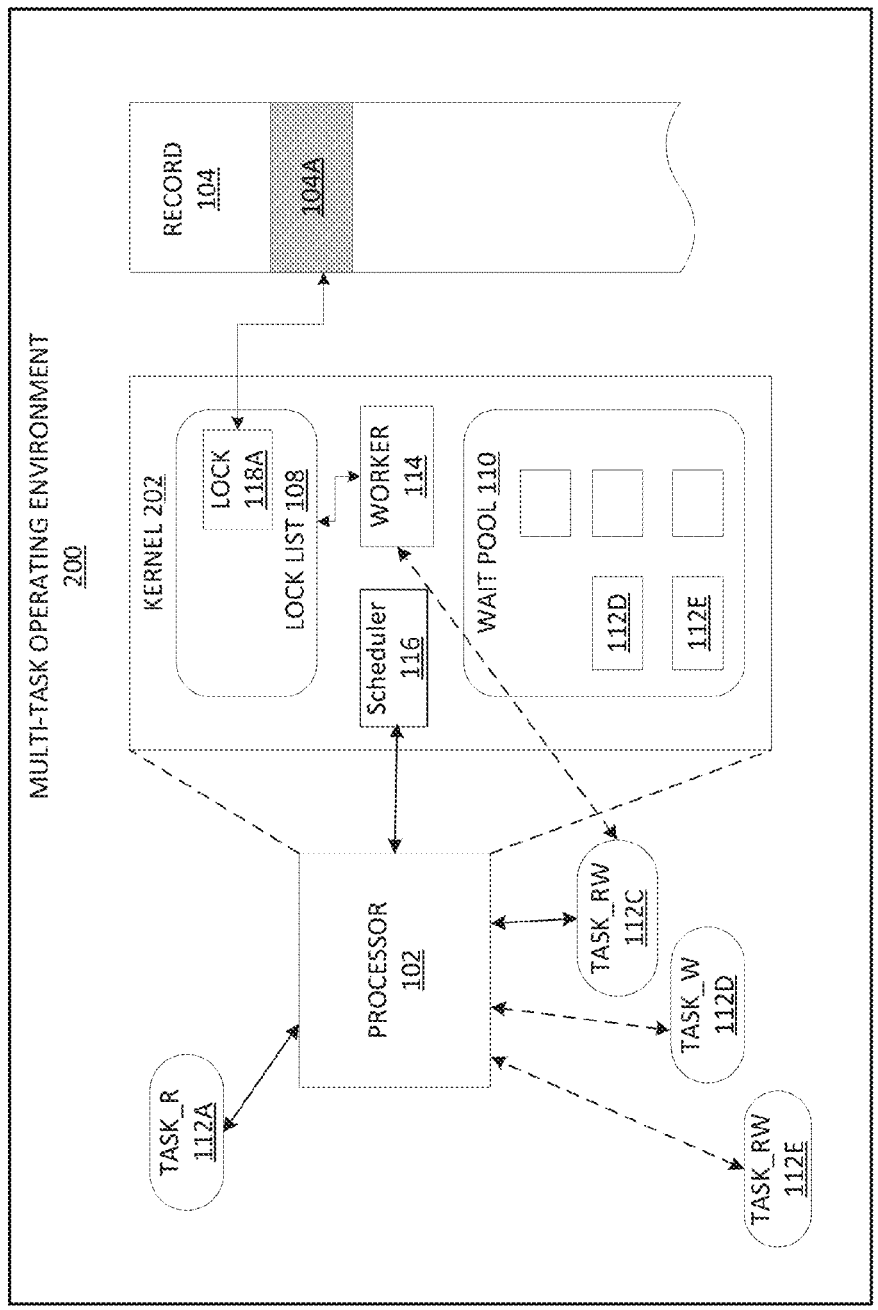
FIGS. 2A-2D illustrate a multi-task operating environment including a kernel to manage file locks according to implementations of the disclosure.

Aspects of the present disclosure address the above deficiencies. In an implementation, the kernel may configure tasks with functionality so that one (or a small subset) of the tasks in a wait pool may be designated as an idle worker task. The idle worker task may stay in an idle state while in the wait pool waiting for the release of a lock from lock list 110. In the event of one or more locks in lock list 108 being released, a scheduler of the kernel may wake up the designated worker task from the wait pool while other tasks in the wait pool remain in the idle state. The worker task after awakening may attempt to acquire a file lock for itself and on behalf of tasks that are still in wait pool 110. Additionally, the worker task may designate a new idle worker task in the wait pool. FIG. 2A illustrates a multi-task operating environment 200 including a kernel 202 that uses a worker task to acquire a file lock according to an implementation. Referring to FIG. 2A, for each task coming into an execution queue of the operating environment 200, kernel 202 may be programmed to assign the task certain features that may eliminate the "thundering herd" effect.

In one implementation, task 112C may be designated as an idle worker task in the wait pool 110. In the event that the lock of task 112B is released, scheduler 116 of kernel 202 may wake up tasks according to the worker status associated with the tasks, or only the idle worker task 112C as shown in FIG. 2A. Worker task 112C, once woken up, may be converted from the idle state to a worker state 114 (referred to as "worker") while keeping tasks 112D, 112E in the idle state. Worker 114 may attempt to acquire a file lock for task 112C-112E.

In one implementation, worker 114 may attempt to acquire a lock first for itself (task 112C) and then for at least one of tasks in wait pool 110 (e.g., 112D or task 112E). In another implementation, worker 114 may attempt to acquire a lock first for at least one of task in wait pool 110 (e.g., 112D or task 112E) and then for itself (task 112C).

Figure 2B:
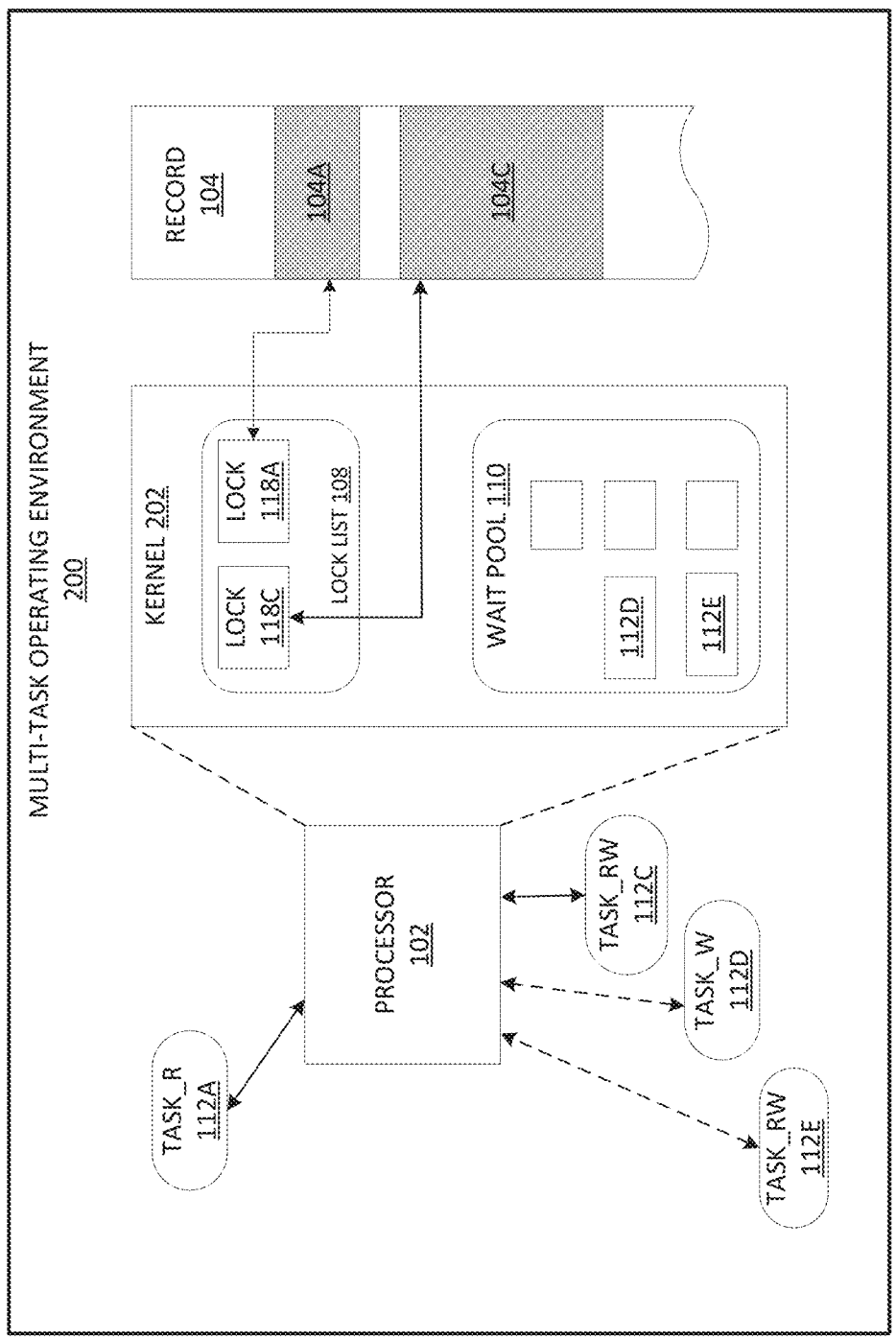

In one implementation, worker 114 may successfully acquire a lock for itself while failing to acquire one for task 112D or 112E. In this scenario, referring to FIG. 2B, a lock 118C may be added to lock list 108 to lock a byte range 104C for task 112C. Subsequent to the acquisition of the lock 118C, kernel 202 executed on processor 102 may first execute worker task 112C to designate a new worker task in wait pool 110 such as task 112D and then safely execute task 112C. Tasks 112D, 112E may stay idle in wait pool 110 waiting for next release of a lock.

Figure 2C:
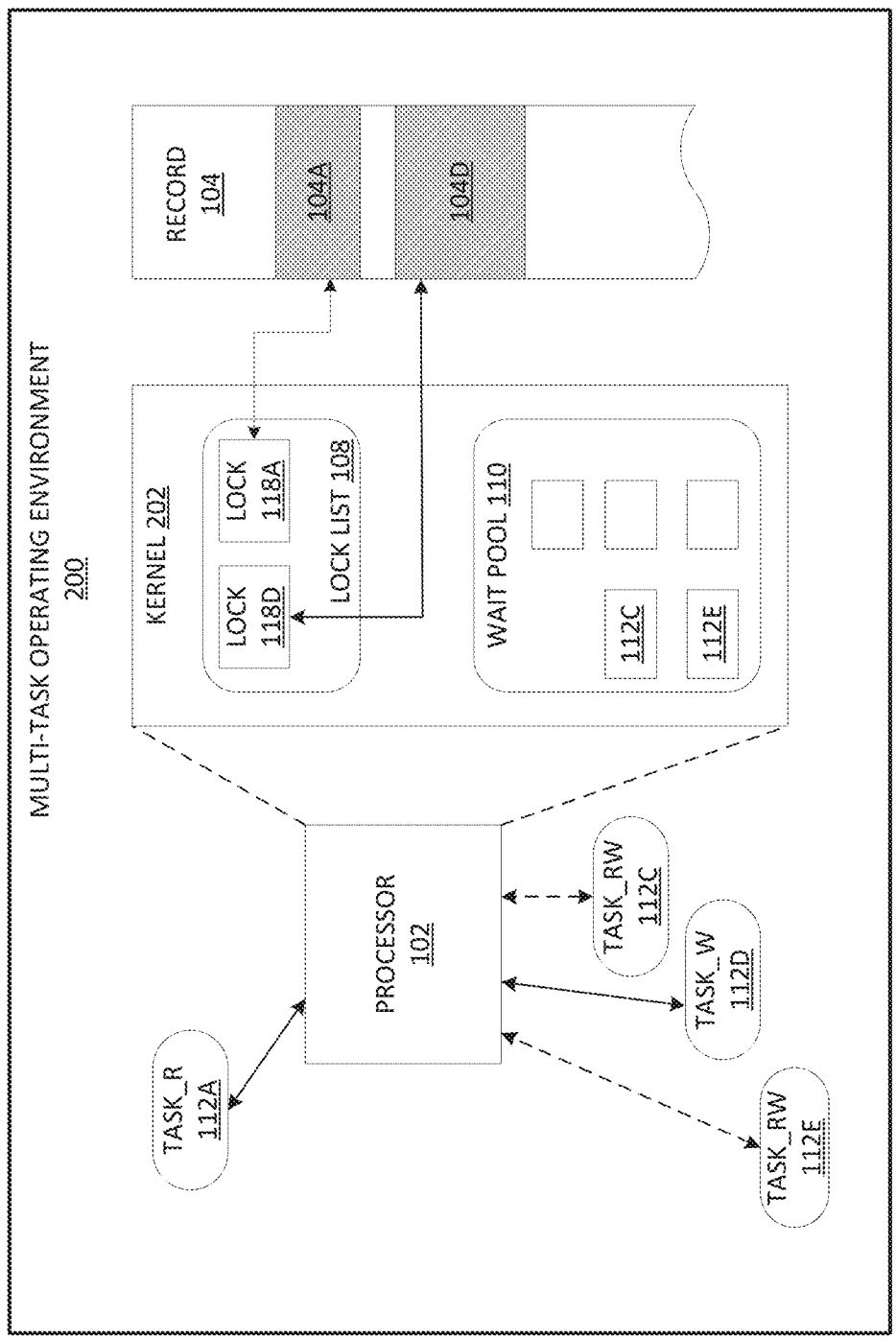

In another implementation, worker 114 may successfully acquire a lock for a task other than itself. Referring to FIG. 2C, for example, worker 114 may acquire a lock 118D for task 112D, but fail to acquire a lock for tasks 112C, 112E. In this scenario, a lock 118D may be added to lock list 108 to lock a byte range 104D for task 112D. Subsequent to the acquisition of lock 118D, kernel 202 may return task 112C to wait pool 110 still as the designated worker task, and may start the execution of task 112D. Alternatively, kernel 202 may return task 112C to wait pool 110, and may execute task 112D to designate a worker task among the tasks in wait pool 110, and may then safely execute task 112D.

Figure 2D:
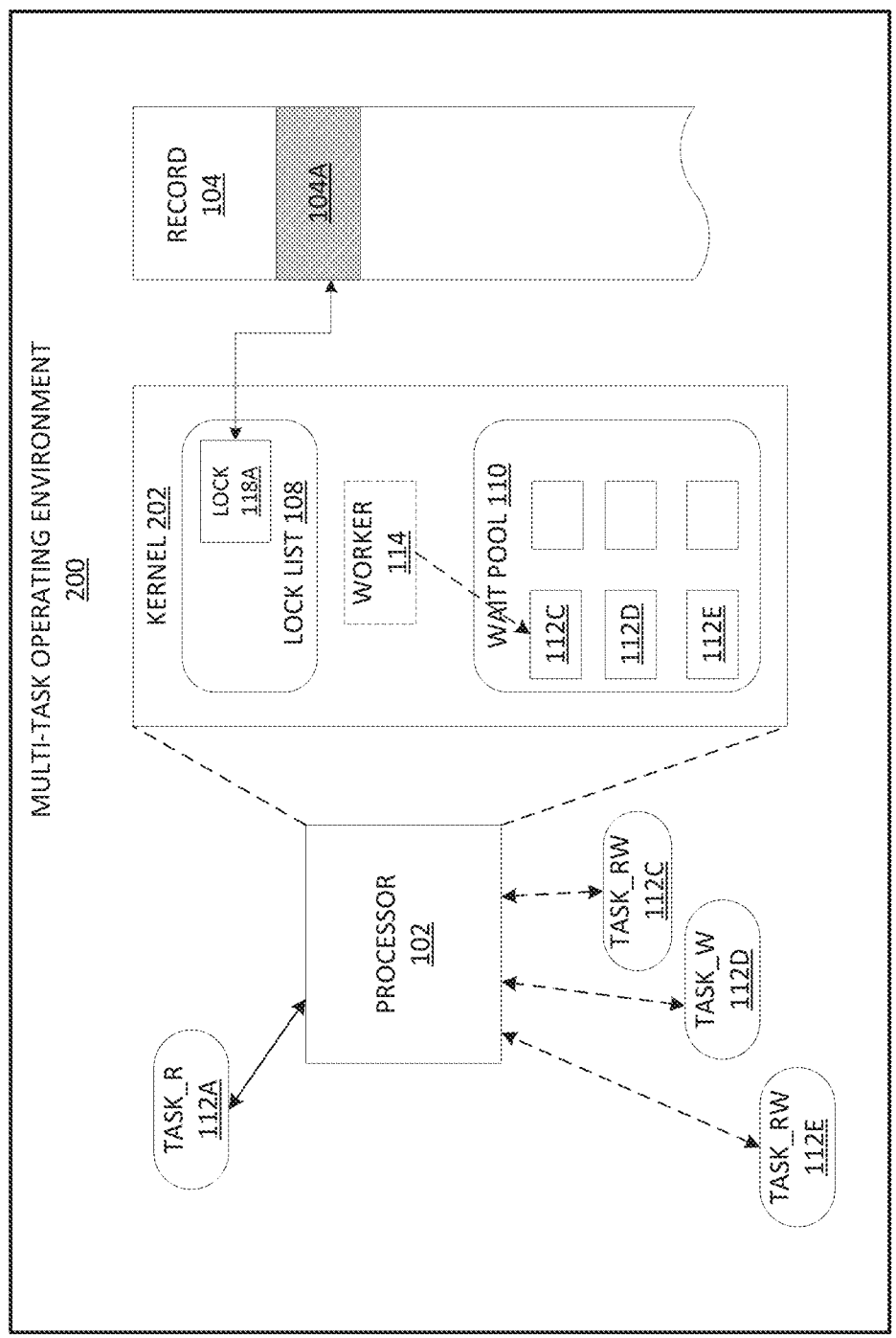

In yet another implementation, worker 114 may not be able to acquire a lock for any tasks in wait pool 110. Referring to FIG. 2D, in this scenario, kernel 202 may return task 112C to the wait pool as the designated idle worker task and wait for the next release of lock from lock list 108.

In an implementation, the worker may be designated according to a chronological order. For example, processor 102 may execute a worker task that already acquired a lock to designate the task having been in wait pool 110 the longest time as the worker. In this way, the maximum waiting time for tasks may be reduced. In an alternative implementation, the worker may be designated in a reverse chronological order. For example, processor 102 may execute a worker task that already acquired a lock to designate the task having been in wait pool 110 the shortest time as the worker. In this way, a fast retrieval of the worker task from a stack may be achieved. In yet another implementation, the worker may be designated randomly among tasks in wait pool 110. In this way, each task in wait pool 110 may have an equal chance to be a worker task.

In an implementation, a subset of tasks in wait pool 110 may be designated as workers so that less than all tasks in wait pool 110 may be woken up in the event of release of a lock. When woken up, the subset of worker tasks may attempt to acquire locks for themselves and tasks that remain in wait pool 110. Although some of the subset of tasks may fail to acquire a lock and need to return to wait pool 110, the number of tasks that need to return to wait pool 110 is much smaller than that when all tasks in wait pool 110 are woken up. In one implementation, the number of tasks designated as worker tasks may be two. In another implementation, the number of tasks designated as worker tasks may be fewer than five.

Figure 3:
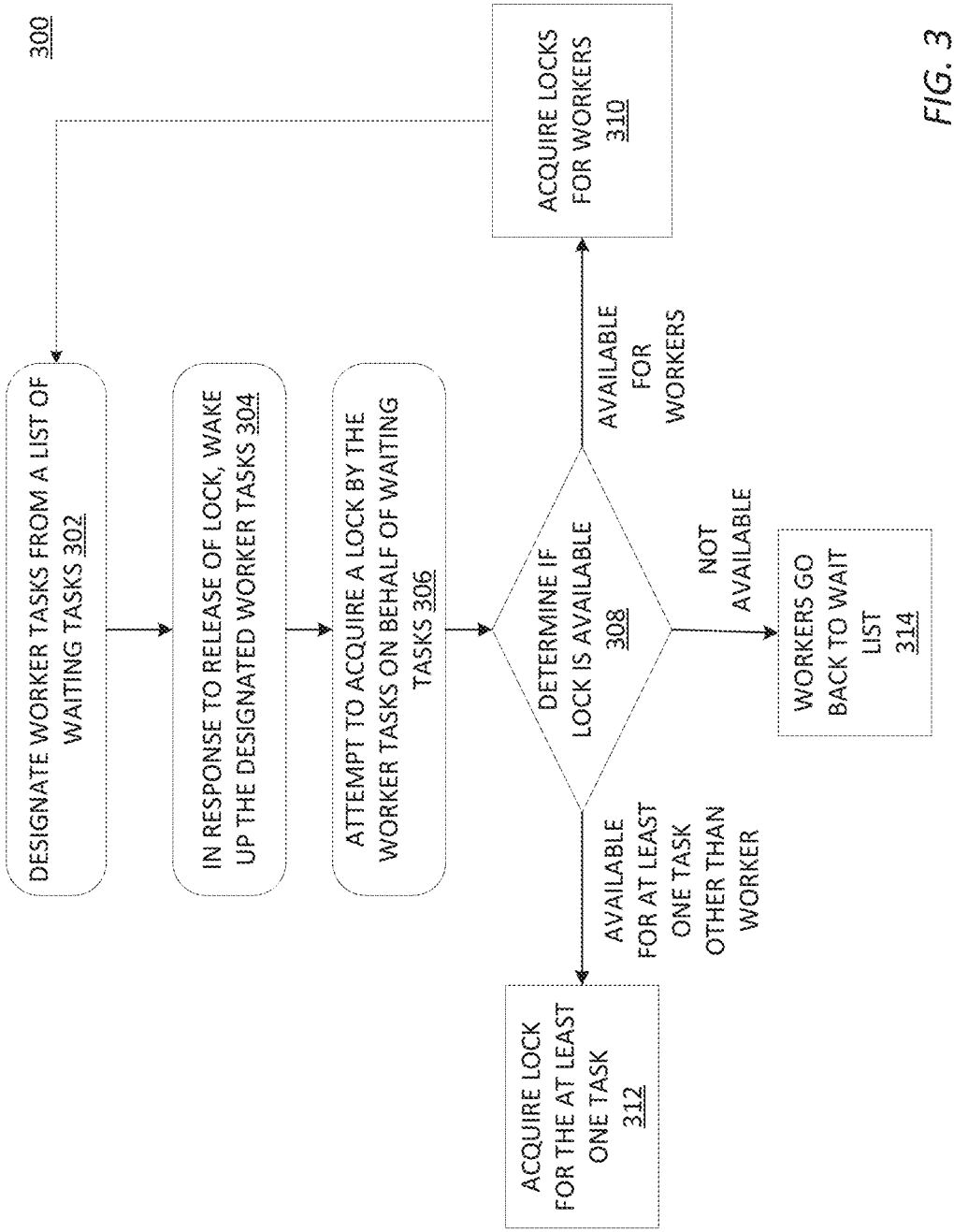
FIG. 3 is a flow diagram of a method for a kernel to manage file locks according to an implementation of the present disclosure.

FIG. 3 shows a flow diagram illustrating an example of a method 300 for managing file locks in a multi-task operating environment according to implementations of the present disclosure. Method 300 may be performed by a processing logic that may include hardware (e.g., circuitry, dedicated logic, programmable logic, microcode, etc.), software (e.g., instructions run on a processing device to perform hardware simulation), or a combination thereof. In one example, method 300 may be performed by processor 102 executing kernel 202 of multi-task operating environment 200 as shown in FIGS. 2A-2D.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 3, at 302, one or more idle tasks in a wait pool may be designated as idle worker tasks. The designation may be performed by a current worker task that already acquires a lock to a record. Tasks including the designated worker tasks in the wait pool may be in an idle state, i.e., suspended from active execution by kernel 202 because they have not acquired a lock to record 104. At 304, a lock of a currently-executing task may be released from lock list 108. The release may be the result of a completion or abort of the currently-executing task. In response to the release of the lock in lock list 108, the kernel 202 (e.g., via scheduler 116) may wake up the one or more worker tasks in wait pool 110 so that the woken up worker tasks may start to perform functions of workers. At 306, workers can attempt to acquire locks to record 104 on behalf of at least one task that is still idle in the wait pool. In one implementation, the woken workers may attempt to acquire a lock for all tasks in wait pool 110. Additionally, workers can attempt to acquire locks for themselves. At 308, workers may determine whether the attempts to acquire locks are successful, and if successful, which locks are acquired.

When the one or more workers cannot acquire any lock either for the tasks in the wait pool or themselves, at 314, the kernel 202 may return the one or more workers to the wait pool 110. In one implementation, the one or more workers may remain designated as worker tasks. In another implementation, new worker tasks may be designated in accordance to criteria such as chronological order, reverse chronological order, or random order as discussed above.

When the one or more workers are able to acquire locks only for themselves, at 310, the one or more workers acquire locks to the record 104 for themselves so that the worker tasks may be ready for executions. Further, at 302, the workers that already acquire a lock and ready to be executed may designate new worker tasks from wait pool 110 in accordance to criteria such as chronological order, reverse chronological order, or random order as discussed above. The new worker tasks may be woken up in response to the next release of a lock in the lock list 108.

When the one or more workers are able to acquire locks for at least one task in wait pool 110 other than the one or more worker tasks themselves, at 312, the at least one task acquires a lock so that the at least one task may be ready for execution. If the one or more workers cannot acquire locks for themselves, kernel 202 may return them back to wait pool 110 in the idle state. In one implementation, the one or more workers may remain designated as worker tasks. In another implementation, new worker tasks may be designated in accordance to criteria such as chronological order, reverse chronological order, or random order as discussed above.

In one implementation, only one task is woken up as the worker for acquiring lock on behalf of all tasks in wait pool 110. The worker designation may be assigned as discussed in above implementations. Alternatively, the worker is not designated in advance. Instead, in response to the release of a lock from lock list 108, the scheduler 116 in kernel 202 may select a task from wait pool 110 and wake up the selected task as the worker. The selection of worker may be achieved according to a property or a combination of properties associated with tasks in wait pool 110. Properties used to select a worker may include the wait time of a task in wait pool, a priority of the waiting tasks, the relationship between the currently-executing tasks and the waiting tasks, and the relationship between the just-finished task and the waiting tasks. In this way, the step to designate a worker may be eliminated.

Figure 4:
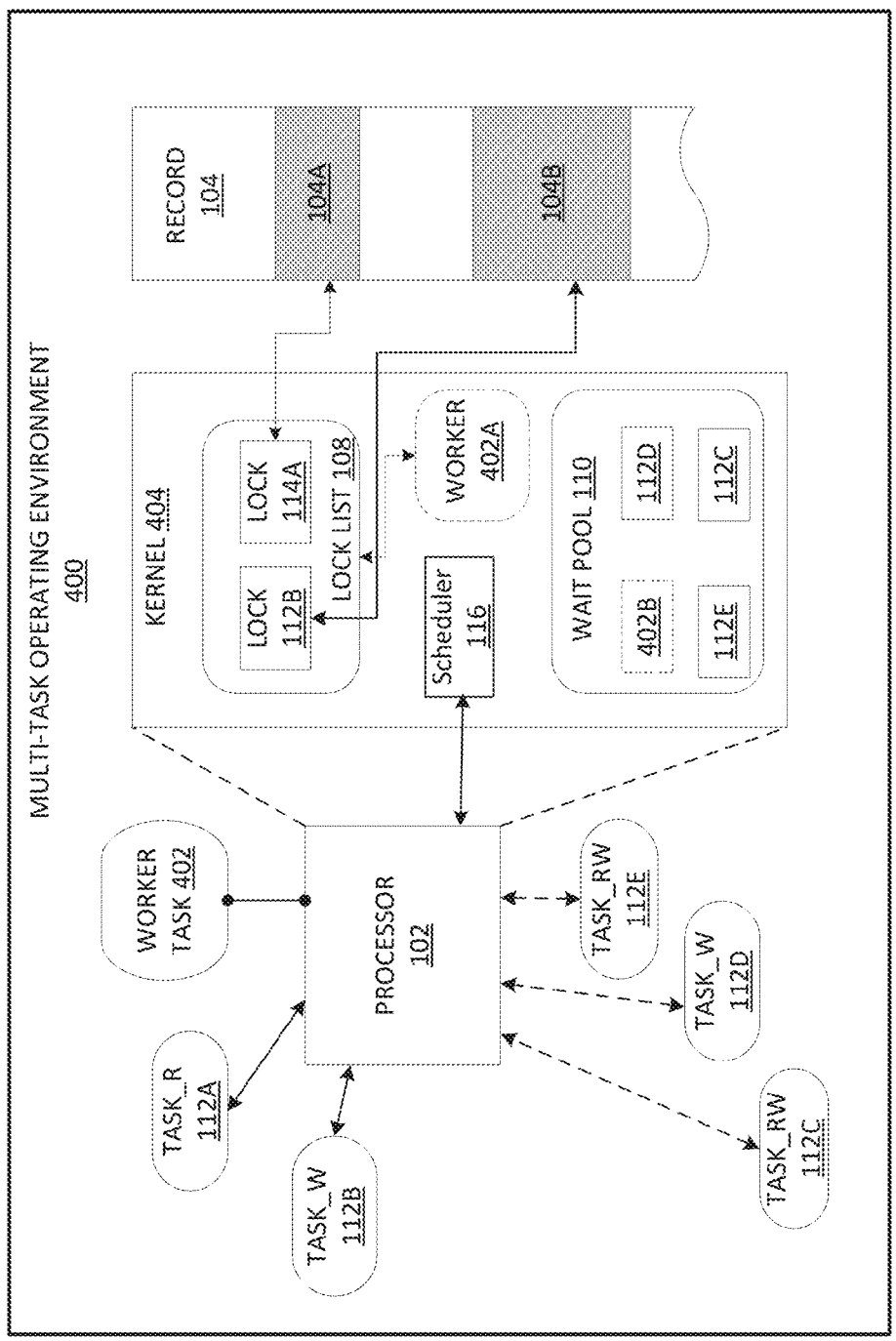
FIG. 4 illustrates a multi-task operating environment including a kernel to manage file locks according to another implementation of the present disclosure.

In one implementation, rather than designating new workers in wait pool 110, a kernel of the multi-task operating environment may maintain a dedicated worker task that is solely for acquiring file locks for tasks in wait pool 110. FIG. 4 illustrates a multi-task operating environment 400 including kernel 404 to manage file locks according to another implementation of the present disclosure. Referring to FIG. 4, kernel 404 of multi-task operating environment 400 may maintain and execute a dedicated worker task 402 that may acquire locks on behalf tasks in wait pool 110. The dedicated worker task 402 does not need to access record 104 and thus does not attempt to acquire a lock for itself. In one implementation, the dedicated worker task 402 may be a worker 402A that is outside the wait pool 110 and be active while waiting for the release of a lock in lock list 108. In response to the release of a lock from lock list 108, scheduler 116 in kernel 404 may activate worker 402A to acquire a lock of record 104 on behalf of tasks 112C-112E. In one implementation, worker 402A may be programmed as part of scheduler 116. In an alternative implementation, worker task 402 may be a dedicated worker task 402B in wait pool 110. The dedicated worker task 402B is in an idle state while in wait pool 110. In response to the release of a lock in lock list 110, the scheduler 116 in kernel 404 may wake up worker task 402B first so that worker task 402B may attempt to acquire a lock on behalf of tasks in wait pool 110. The method for worker task 402A or 402B to acquire a lock may include operations similar to those as shown in FIG. 3.

Figure 5:
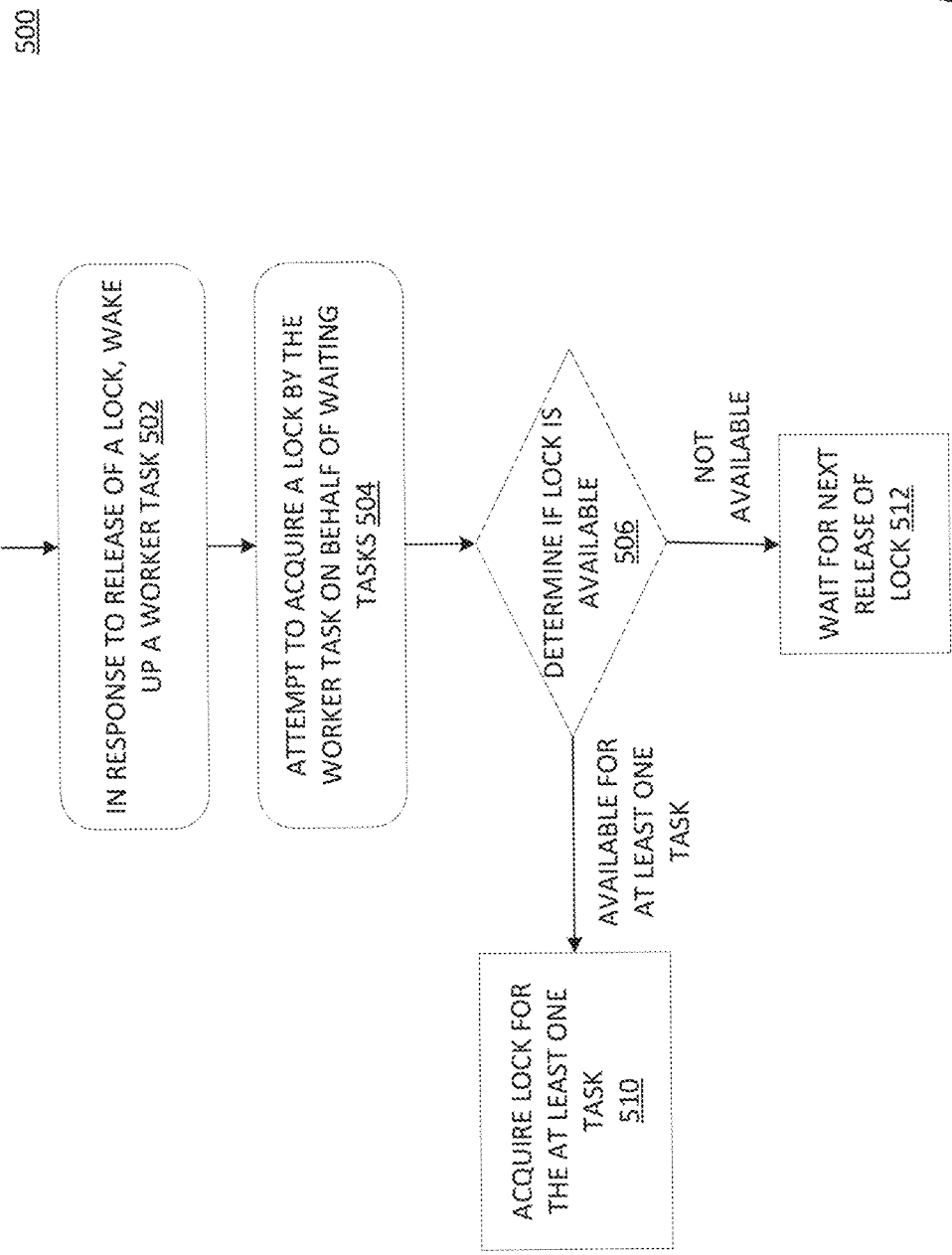
FIG. 5 is flow diagram of a method for a kernel to manage file locks according to another implementation of the present disclosure.

FIG. 5 shows a flow diagram illustrating an example of a method 500 for managing file locks in a multi-task operating environment using a dedicated worker task according to implementations of the present disclosure. Method 500 may be performed by a processing logic that may include hardware (e.g., circuitry, dedicated logic, programmable logic, microcode, etc.), software (e.g., instructions run on a processing device to perform hardware simulation), or a combination thereof. In one example, method 500 may be performed by processor 102 and kernel 106 of multi-task operating environment 400 as shown in FIG. 4.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 5, at 502, in response to the release of a lock in lock list 108, kernel 404 (e.g., via scheduler 116) may wake up an idle worker task (such as 402B as shown in FIG. 4). However, if the worker task (such as 402A as shown in FIG. 4) is already active, the worker task attempts to acquire a lock on behalf of idle tasks in wait pool 110 (block 504). At 506, the scheduler 116 of kernel 404 may determine if a lock can be acquired for any of the tasks in wait pool 110. At 512, if a lock cannot be acquired, by the worker task 402, for any tasks in wait pool 110, the scheduler 116 of kernel 404 may return the worker task back to its original state (idle or active). At 510, if a lock is available for at least one task in wait pool 110, the worker task acquires the lock for the at least one task. Kernel 404 may start executing the at least one task subsequent to the acquisition of the lock. The scheduler 116 of kernel 404 may further return the worker task 402 back to its original state (idle or active).

In some implementations, although the dedicated worker task may involve the management of an extra task, the dedicated worker task may allow the processor to quickly start to execute a task that has acquired a lock to the record because the task does not need to designate a worker task in the wait pool.

Figure 6:
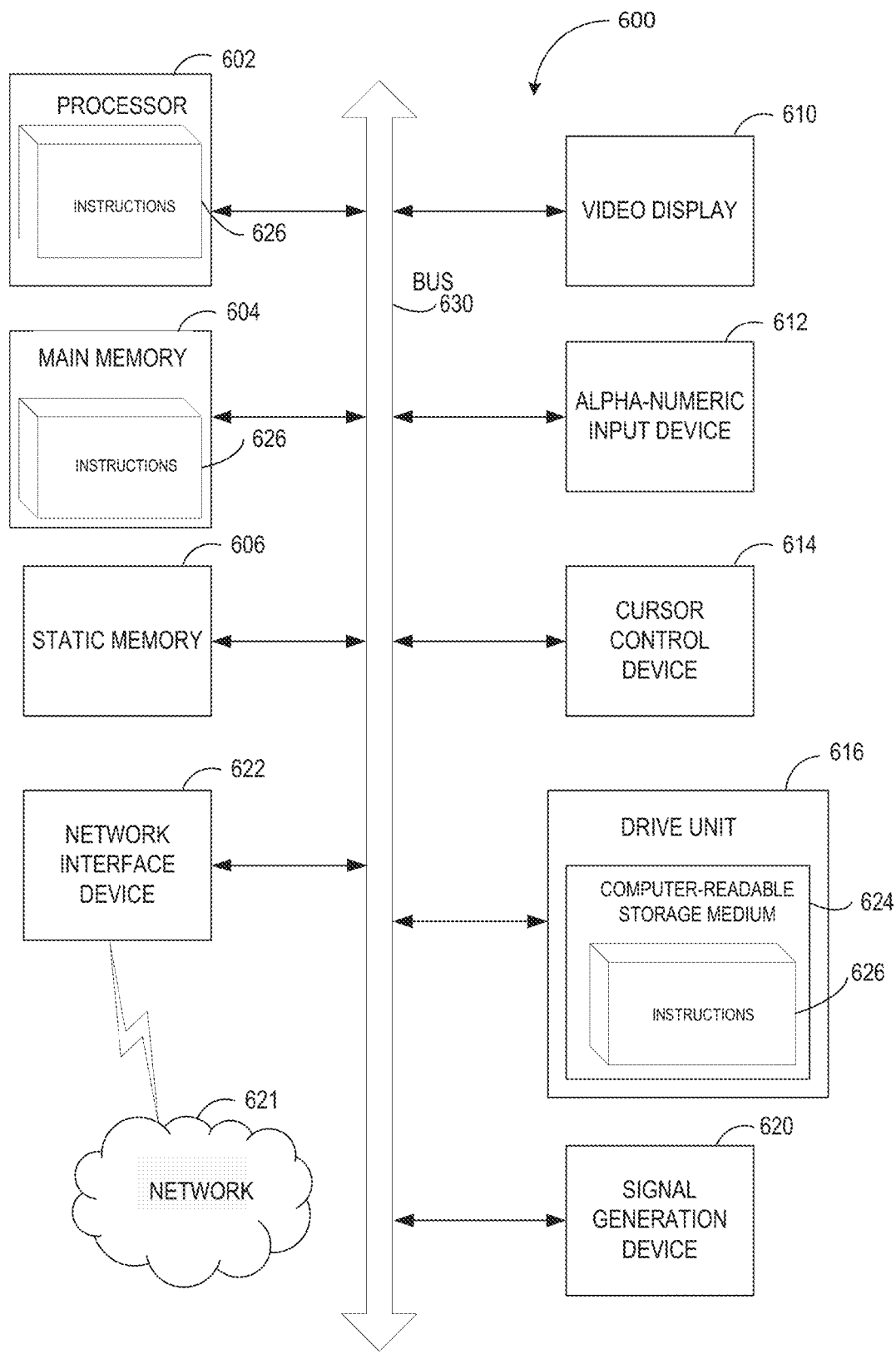
FIG. 6 shows a diagrammatic representation of a machine in the form of a computer system, in accordance with one example.

FIG. 6 depicts a diagrammatic representation of a machine in the form of a computer system 600 within which a set of memory instructions 626, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processor 602 (e.g., a processing device), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the operations for performing steps discussed herein.

The computer system 600 may further include a network interface device 622. The network interface device may be in communication with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 626 (e.g., instructions executed by the kernels 202, 404) for the computer system 100 representing any one or more of the methodologies or functions described herein. The instructions 626 for the computer system 100 may also reside, completely or at least partially, within the main memory 604 and/or within the processor 602 during execution thereof by the computer system 600, the main memory 604 and the processing device 602 also constituting computer-readable storage media. The instructions 626 for the computer system 100 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   initiating, by a processing device executing a kernel, execution of an active task that has acquired a first lock to a record, wherein a plurality of idle tasks are waiting to access the record, and wherein one of the plurality of idle tasks was previously designated as a worker task;
   in response to releasing, by the active task, the first lock to the record, waking up the designated worker task out of the plurality of idle tasks; and
   attempting, by the designated worker task, an acquisition of a second lock on behalf of at least one of the remaining plurality of idle tasks.

2. The method of claim 1, wherein the worker task is to acquire the second lock on behalf of the at least one of the remaining plurality of idle tasks.

3. The method of claim 1, wherein the designated worker task is to determine whether the second lock is available for the acquisition in view of race situations with the plurality of active tasks.

4. The method of claim 1, further comprising:
   determining that the second lock is acquired for the at least one of the remaining plurality of task;
   waking up, by the processing device executing the kernel, the at least one of the remaining tasks;
   initiating execution of the at least one of the remaining plurality of tasks; and
   returning the designated worker task to the idle state.

5. The method of claim 4, wherein the designated worker task is to designate another remaining task of the plurality of idle tasks as a new worker task.

6. The method of claim 3, further comprising:
in response to determining that the worker task fails to acquire any lock for the at least one of the remaining plurality of tasks, returning, by the processing device executing the kernel, the designated worker task back to the idle state.

7. The method of claim 1, further comprising maintaining a lock list storing locks of a plurality of active tasks and a wait list storing identifications of the plurality of idle tasks.

8. The method of claim 7, wherein the lock list is a semaphore data object comprising a plurality of units each of which corresponds to a lock that locks a respective byte range of the record.

9. An apparatus comprising:
a memory; and
a processing device operatively coupled to the memory, the processing device to execute a kernel to:
   initiate execution of an active task that has acquired a first lock to a record, wherein a plurality of idle tasks are waiting to access the record, and wherein one of the plurality of idle tasks was previously designated as a worker task;
   in response to releasing, by the active task, the first lock to the record, wake up the designated worker task out of the plurality of idle tasks; and
   attempt, by the designated worker task, an acquisition of a second lock on behalf of at least one of the remaining plurality of idle tasks.

10. The apparatus of claim 9, wherein the worker task is further to acquire the second lock on behalf the at least one of the remaining plurality of the idle tasks.

11. The apparatus of claim 9, wherein the designated worker task is to determine whether the second lock is available for the acquisition in view of race situations with the plurality of active tasks.

12. The apparatus of claim 9, wherein the processing device executing the kernel is further to:
   determine that the second lock is acquired for the at least one of the remaining plurality of tasks;
   wake up the at least one of the remaining plurality of tasks;
   initiate execution of the at least one of the remaining plurality of tasks; and
   return the designated worker task to the idle state.

13. The apparatus of claim 12, wherein the designated worker task is to designate another remaining task of the plurality of idle tasks as a new worker task.

14. The apparatus of claim 11, wherein in response to determining that the worker task fails to acquire any lock for the at least one of the remaining of the plurality of tasks, the processing device executing the kernel is further to return the designated worker task back to the idle state.

15. The apparatus of claim 9, wherein the processing device executing the kernel further to maintain a lock list storing locks of a plurality of active tasks and a wait list storing identifications of the plurality of idle tasks.

16. A non-transitory computer readable storage medium storing instructions that, when executed by a processing device, cause the processing device to:
   initiate, by the processing device executing a kernel, execution of an active task that has acquired a first lock to a record, wherein a plurality of idle tasks are waiting to access the record, and wherein one of the plurality of idle tasks was previously designated as a worker task;
   in response to releasing, by the active task, the first lock to the record, wake up the designated worker task out of the plurality of idle tasks; and
   attempt, by the designated worker task, an acquisition of to acquire a second lock on behalf of at least one of the remaining plurality of idle tasks.

17. The non-transitory computer readable storage medium of claim 16, wherein the worker task is to acquire the second lock on behalf at least one of the remaining plurality of the idle tasks.

18. The non-transitory computer readable storage medium of claim 16, wherein the designated worker task is to determine whether the second lock is available for the acquisition in view of race situations with currently-executing tasks.

19. The non-transitory computer readable storage medium of claim 16, wherein the processing device is further to:
   determine that the second lock is acquired for the at least one of the remaining plurality of tasks;
   wake up the at least one remaining plurality of tasks;
   initiate execution of the at least one remaining plurality of tasks; and
   return the designated worker task to the idle state.

20. The non-transitory computer readable storage medium of claim 18, the designated worker task is to designate another remaining tasks of the plurality of idle tasks as a new worker task.

* * * * *